(12) United States Patent
Baum et al.

(10) Patent No.: US 7,016,319 B2
(45) Date of Patent: Mar. 21, 2006

(54) METHOD AND APPARATUS FOR REDUCING CO-CHANNEL INTERFERENCE IN A COMMUNICATION SYSTEM

(75) Inventors: Kevin L. Baum, Rolling Meadows, IL (US); Brian K. Classon, Palatine, IL (US); Mark C. Cudak, McHenry, IL (US); Vijay Nangia, Schaumburg, IL (US)

(73) Assignee: Motorola, Inc., Schaumburg, IL (US)

(*) Notice: Subject to any disclaimer, the term of this patent is extended or adjusted under 35 U.S.C. 154(b) by 159 days.

(21) Appl. No.: 10/395,782

(22) Filed: Mar. 24, 2003

(65) Prior Publication Data

US 2004/0190482 A1  Sep. 30, 2004

(51) Int. Cl.
*H04Q 7/36* (2006.01)

(52) U.S. Cl. .................. 370/329; 370/341; 370/436; 455/446

(58) Field of Classification Search .............. 370/328, 370/329, 330, 432, 436, 437, 442, 458, 341; 455/506, 516, 446–453, 455
See application file for complete search history.

(56) References Cited

U.S. PATENT DOCUMENTS

| 5,691,709 A | * | 11/1997 | Guntin ...................... 340/7.22 |
| 5,722,043 A | * | 2/1998 | Rappaport et al. ........ 455/452.1 |
| 5,805,633 A | * | 9/1998 | Uddenfeldt .................. 375/133 |
| 5,825,758 A | * | 10/1998 | Heikkinen et al. .......... 370/330 |
| 5,859,841 A | * | 1/1999 | Gitlits ......................... 370/335 |
| 6,011,786 A | * | 1/2000 | Dent ........................... 370/330 |
| 6,262,980 B1 | * | 7/2001 | Leung et al. ................ 370/336 |
| 2002/0118765 A1 | * | 8/2002 | Nangia et al. .............. 375/260 |

OTHER PUBLICATIONS

Zander, Jens. "Radio Resource Management—An Overview" Radio Communication System, Dept of Signals, Sensors & Systems, Royal Institute of Technology, Stockholm Sweden. 1996 IEEE Vehicular Technology Conference.
Cimini, Leanord J. JR., Chuang, Justin, C.I., Sollenburger, Nelson R. Advanced Cellular Internet Service (ACIS) IEEE Communications Magazine Oct. 1998.
Pottie, Gregory J. "System Design Choices in Personal Communications" IEEE Personal Communications Oct. 1995.

* cited by examiner

*Primary Examiner*—Ricky Q. Ngo
*Assistant Examiner*—Duc Duong
(74) *Attorney, Agent, or Firm*—Kenneth Haas

(57) ABSTRACT

A downlink frame (401) is divided in to similar sized resource blocks (403, 405, 407) with each co-channel sector scheduled to transmit from the beginning of its respective assigned resource block. Transmissions to remote units within the particular sector will occur only within the particular resource block, up to a point where all N resource units have been utilized. Beyond that point, additional transmissions are scheduled to be transmitted at the end of the resource blocks assigned to the other sectors.

10 Claims, 12 Drawing Sheets

100

1-CELL, 6-SECTOR, 2-CHANNEL REUSE PLAN

1-CELL, 3-SECTOR, 1-CHANNEL REUSE PLAN

DATA RATES:
Rs  Rs/2  Rs/4  Rs/8
(a)

DATA RATES:
Rs  Rs/3  Rs/6  Rs/12

METHOD AND APPARATUS FOR REDUCING CO-CHANNEL INTERFERENCE IN A COMMUNICATION SYSTEM

FIELD OF THE INVENTION

The present invention relates generally to communication systems and in particular, to a method and apparatus for reducing co-channel interference within such communication systems.

BACKGROUND OF THE INVENTION

Interference often hinders performance of communication systems. One type of interference often encountered by a user within a communication system is interference generated by the transmissions of other users. This is typically caused by many users transmitting within the same channel (e.g., frequency band, time slot, or spreading code), and referred to as co-channel interference. In order to reduce co-channel interference many communication systems employ a channel reuse pattern, where adjacent transmitters transmit on different channels. However, given the price of spectrum, future communications systems will be characterized by aggressive reuse patterns that will result in significantly increased levels of co-channel interference.

Various methods have been proposed for dealing with severe co-channel interference in communication systems, and especially in cellular communication systems. Signal spreading methods (such as direct sequence spread spectrum) can be used to provide processing gain over co-channel interference, but this limits the data rate that can be supported. Moreover, dynamic channel allocation methods have been proposed, but these methods are difficult to implement because they require monitoring of the channel quality, the channel availability, and they also require communication links to be established between different base stations so that the channel allocation process can be controlled and monitored. Moreover, as cellular systems evolve from circuit-centric operation to packet-centric operation, the channel utilization pattern in any given cell becomes much more dynamic, leading to further implementation difficulties (e.g., the channel utilization may change more quickly than the response time of the channel allocation process, making it essentially ineffective). Therefore, there is a need for a method and apparatus that can reduce co-channel interference in a dynamic interference environment, and that can be realized without establishing communications between base stations in different cells.

DETAILED DESCRIPTION OF THE DRAWINGS

In order to address the above-mentioned need, a method and apparatus for avoiding co-channel interference is provided herein. In accordance with the preferred embodiment of the present invention a downlink frame is divided in to similar sized resource blocks with each co-channel sector scheduled to transmit from the beginning of its respective assigned resource block. Transmissions to mobile units within the particular sector will occur only within the particular resource block, up to a point where the resource block can support no further communication to other mobile units. Beyond that point, additional transmissions to other mobile units are scheduled to be transmitted at the end of the resource blocks assigned to the other sectors.

The above transmission technique greatly reduces co-channel interference when compared to prior-art interference avoidance techniques. Additionally the need for different transmitters to communicate with each other in order to coordinate their transmission schedules is eliminated.

The present invention encompasses a method of interference avoidance, the method comprises the steps of dividing at least a portion of a frame into a plurality of resource blocks, each resource block capable of supporting transmission to a plurality of remote units, and for a particular sector, scheduling transmissions to remote units to begin at a beginning of the sector's resource block up to a point where the resource block cannot support any more transmissions, beyond that point, additional transmissions are scheduled to be transmitted within resource blocks assigned to other sectors.

The present invention additionally encompasses a method of interference avoidance within a communication system. The method comprises the steps of dividing at least a portion of a frame into a plurality of resource blocks and assigning each sector within the communication system to a particular resource block. For a particular sector, N transmissions are assigned to the sector's resource block with the N+1 transmission being assigned to occur within another sector's resource block.

The present invention additionally encompasses an apparatus comprising a plurality of sectors and a base station controller dividing at least a portion of a frame into a plurality of resource blocks and assigning each sector within the communication system to a particular resource block, wherein for a particular sector, the base station controller schedules transmissions to remote units to begin at a beginning of the sector's resource block up to a point where the resource block cannot support any further transmissions, beyond that point, additional transmissions are scheduled by the controller to be transmitted within resource blocks assigned to other sectors.

Figure 1:
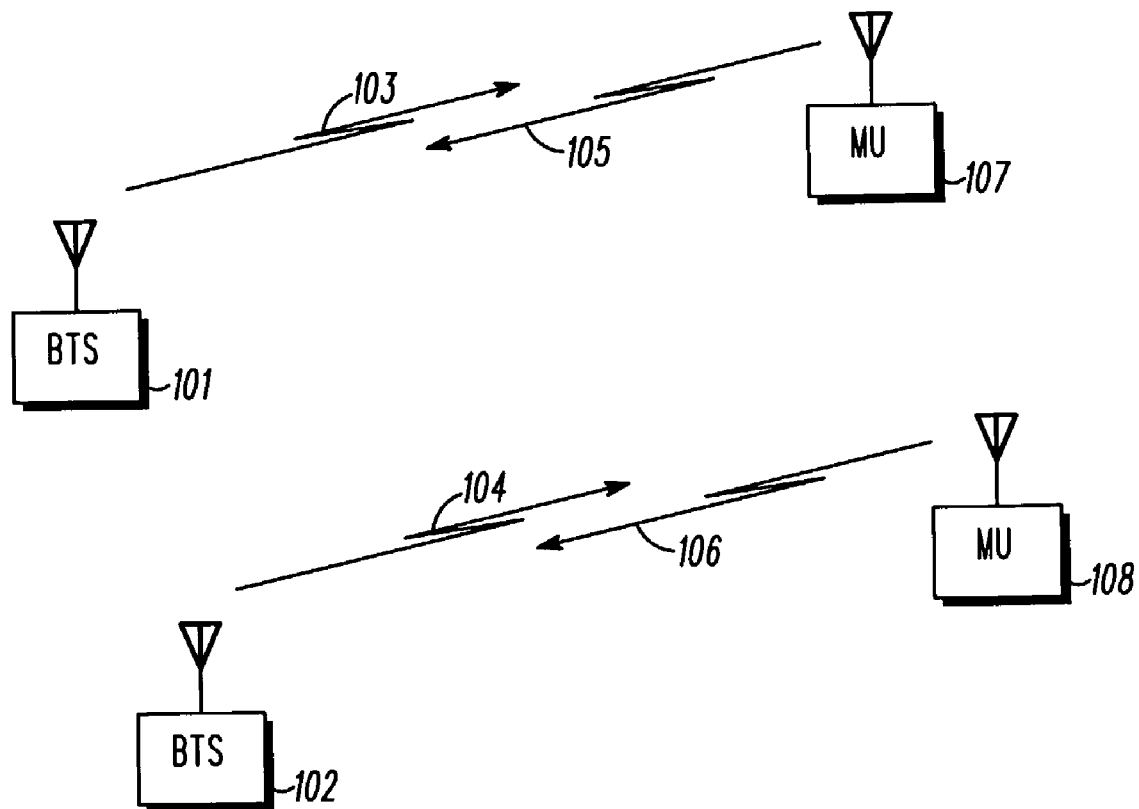
FIG. 1 is a block diagram of a communication system in accordance with the preferred embodiment of the present invention.

Turning now to the drawings, wherein like numerals designate like components, FIG. 1 is a block diagram of communication system 100 in accordance with the preferred embodiment of the present invention. As shown, communication system 100 comprises a plurality of base stations 101, 102 and a plurality of mobile, or remote units 107, 108. As is evident, base stations 101 and 102 are communicating to remote, or mobile units via downlink communication signals 103 and 104, respectively. In a similar manner, mobile units 107 and 108 are communicating to base stations 101 and 102 via uplink communication signals 105 and 106, respectively. In the preferred embodiment of the present invention, communication system 100 may use any number of communication system protocols, such as, but not limited a Code Division Multiple Access (CDMA) system protocol, a Time Division Multiple Access (TDMA) (such as the Global System for Mobile Communications (GSM)) system protocol, or a next-generation system protocol such as Orthogonal Frequency Division Multiplexing (OFDM), OFDMA, interleaved frequency division multiple access (IFDMA), or combinations of these. Regardless of the communication system protocol utilized by communication system 100, in the preferred embodiment, it is assumed that all base stations within system 100 are synchronized (for example, to a common time base) so that their frame periods are at least roughly aligned. This time synchronization maximizes the effectiveness of the time-domain based techniques for interference reduction described below. In an alternate embodiment, however, asynchronous cells may utilize the present invention even though the techniques described below are less sensitive to the use of asynchronous cells.

For simplicity, in the description that follows, the various embodiments of the present invention will be given with respect to downlink transmission. However, one of ordinary skill in the art will recognize that the various embodiments given below may be applied to uplink transmissions as well, and as applied, will also be effective for avoiding interference on the uplink.

Figure 2:
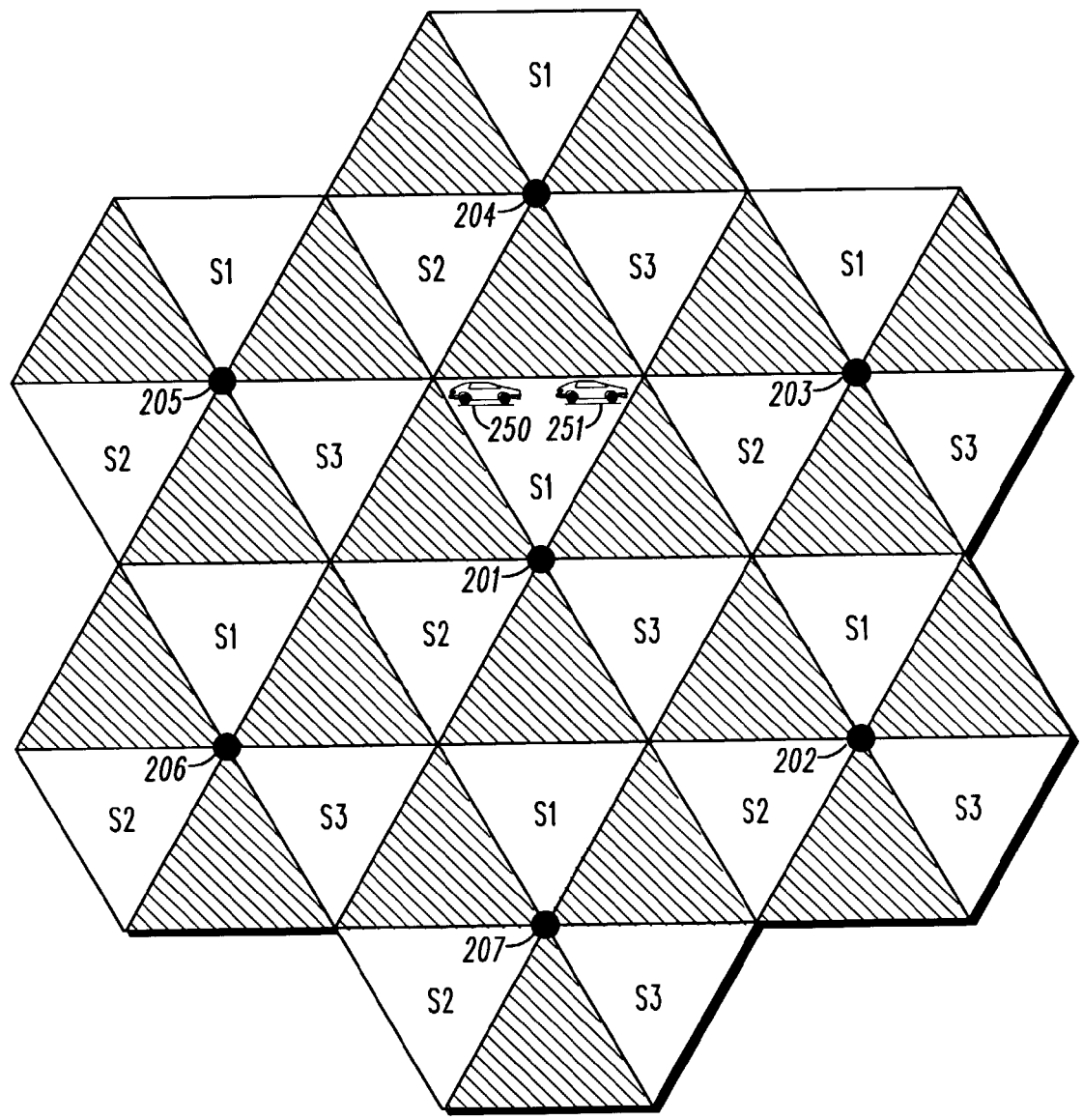
FIG. 2 illustrates a typical channel reuse pattern for the communication system of FIG. 1.

As discussed above, interference may occur within communication system 100 when downlink communication signals 103 and 104 utilize the same channel resources. In order to address this issue a frequency reuse pattern is often utilized where adjacent cells/sectors utilize different frequencies (and directional transmissions in the case of cells with directional sectors. Note that a cell that has an omni-directional antenna can be considered to be a cell with only one sector). The different frequencies and directional transmissions greatly reduce the interference power seen by the remote units. To a remote unit in a desired cell/sector, the dominant interferers are the neighboring base stations that are transmitting on the same frequency towards the remote user. This is illustrated in FIG. 2. In particular, FIG. 2 illustrates a 1-cell, 6-sector, 2-frequency (1,6,2,) reuse plan. For the depicted (1,6,2) reuse plan, sectors labeled S1, S2, and S3 utilize the same channel (frequency or code) set for transmissions. It can be seen that for the (1,6,2) reuse pattern, each mobile unit (especially near the edge of the cell) experiences co-channel interference from two dominant neighboring co-channel cells/sectors. For example, mobile unit 250 of FIG. 2 is receiving a desired signal that is transmitted in sector S1 from base station 201. However, since realistic directional antennas for sectored transmissions are not capable of completely confining the signal energy emissions within the 60 degree sector widths illustrated in FIG. 2, mobile unit 250 also receives significant co-channel interfering signals from the transmissions of base station 204 in its sector S2, and also from the transmissions of base station 205 in its sector S3. These interfering signals can be nearly the same strength as the desired signal because the distance between the mobile 250 and each of the base stations 201, 204, and 205 is approximately the same. The remaining co-channel sectors of FIG. 2. are not dominant interferers to mobile unit 250 because of their much larger relative distance and/or the directional nature of their transmissions. Similarly, it can be observed that mobile unit 251 receives significant co-channel interference from sector S3 of base station 204 and from sector S2 of base station 203.

As discussed above, given the price of spectrum, future communications systems will be characterized by even more aggressive reuse patterns that will result in significantly increased levels of co-channel interference. This is illustrated in the (1,3,1) reuse pattern described in FIG. 3. As shown, all sectors utilize the same channel set during transmission. For the (1,3,1) reuse-pattern, each mobile unit (especially near the edge of the cell) experiences co-channel interference from between two and four dominant neighboring co-channel cells/sectors. For example, if mobile unit 353 is located within sector S1 at the position illustrated in FIG. 3, the dominant co-channel interferers are S2 and S3 of 303, while S2 of 302 and S3 of 304 are also potentially significant interferers. For mobile unit 350, the dominant interferers include S2 of 301 (intra-cell interference), S3 of 304, and S2 of 303.

Hence, it can be seen that for the (1,6,2) reuse pattern, each mobile unit may experience co-channel interference from two dominant neighboring co-channel cells/sectors. For the (1,3,1) reuse-pattern, each mobile unit may experience co-channel interference from between two and four dominant neighboring co-channel cells/sectors. In order to address this issue, in the preferred embodiment of the present invention at least a portion of a downlink frame is divided in to somewhat similar sized resource blocks with each co-channel sector scheduled to transmit from the beginning of its respective assigned resource block. The resource blocks can be viewed as groups of resource units (resource unit) such as logically adjacent time slots in a system using time domain interference avoidance, or logically adjacent frequency sub-channels (e.g., subcarriers in a Multicarrier modulation system such as OFDM) in a system using frequency domain interference avoidance, or logically adjacent orthogonal codes or spreading codes in a system using code domain interference avoidance, or more generally any combination of logically adjacent time, frequency, code, or other resources known in the art. More generally, in the preferred embodiment of the present invention the resource blocks are blocks taken from the group consisting of any combination of logical channels, IFDMA chanellization codes, time slots, frequency sub-channels, orthogonal codes, and spreading codes.

Figure 4:
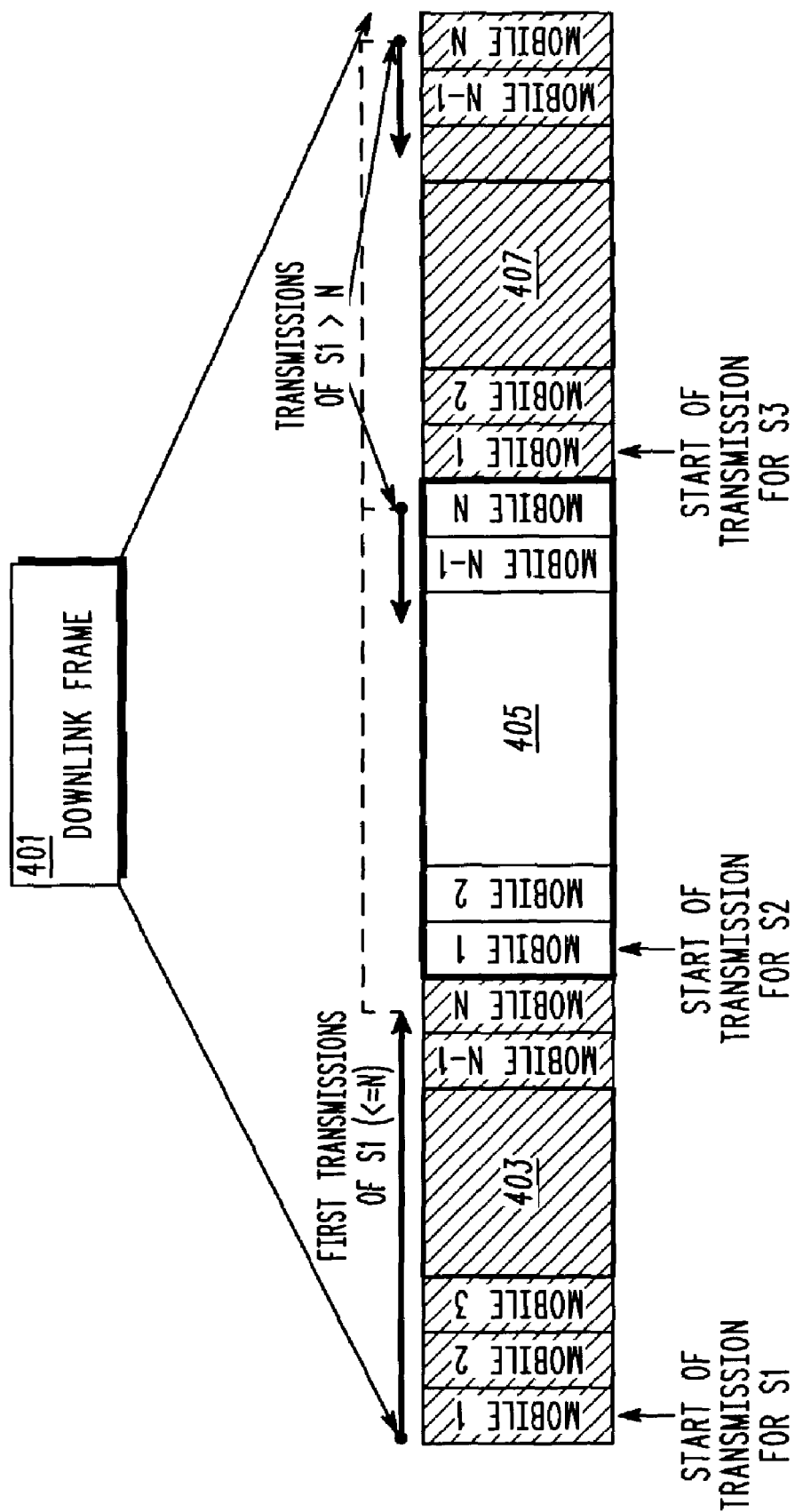
FIG. 4 illustrates interference avoidance in accordance with the preferred embodiment of the present invention.

For the (1,3,1) and (1,6,2) reuse-patterns, the number of resource blocks is equivalent to the number of same-frequency sectors with in the cell. This is illustrated in FIG. 4 for a (1,6,2) and (1,3,1) reuse pattern which have three co-channel sectors per cell.

As is evident, downlink frame 401 has been divided up into M (where M=3 for (1,6,2) and (1,3,1) reuse) specific resource blocks 403, 405, 407. It is desired, but not required, that the resource blocks each contain roughly the same number of resource units. Thus, for a (1,3,1) or (1,6,2) reuse pattern, the desired total number of downlink resource units shown is MN, or in this case 3N. However, if for example the total number of resource units is not divisible by three, uneven sized resource blocks can be used.

Even though each resource block may have a different size, for simplicity of description each resource block will be provided N resource units. Also, for simplicity of description, the entire frame is divided into resource units, however, as will be come evident below, the whole frame need not be broken up into resource blocks. In general, some additional portions of the frame may also be present (e.g., synchronization information, etc.)

In the preferred embodiment of the present invention each sector within communication system 100 is assigned a particular resource block 403, 405, 407 within frame 401 for downlink transmissions. Transmissions to mobile units within the particular sector will occur only within the particular resource block, up to a point where all N resource units have been utilized. Beyond that point, additional transmissions are scheduled to be transmitted at the end of the resource blocks assigned to the other sectors. For this particular example, the first two additional transmissions within S1 (assigned to block 403) are scheduled at the end of resource blocks 405 and 407. The next two additional transmissions of S1 are scheduled one resource unit earlier than the end of the other two resource blocks 405 and 407, and so on. Note that additional transmissions may cause wrap-around to the beginning or end of the frame as necessary (e.g., the $2N+1^{st}$ transmission from S1 may occur in the last resource unit of the frame). An alternate embodiment could make the additional transmissions pusedo-randomly distributed throughout the other resource blocks using a known interference averaging (hopping technique), which spreads the additional interference evenly amongst the other sectors but does not allow for exploiting the uneven interference generated by the preferred embodiment, as will be described later.

A further alternate embodiment continues additional transmissions at the end of the current resource block. This is a simple construction that maintains interference avoidance up to filling the desired sector's resource block, but does not distribute the interference for additional transmissions evenly to the other sectors. Another alternate embodiment uses the transmission order of the sector assigned resource block in which additional transmissions are scheduled. However, this arrangement causes the first additional transmission outside of a resource block to interfere with the first transmissions of another resource block.

It should be noted that while one may equate a resource unit with a transmission to a particular mobile unit, transmissions to mobile units need not occur in the same resource unit within consecutive frames, and in additionally may occur over multiple resource units within the frame. Therefore, it is more accurate to refer to the amount of data to be transmitted in terms of number of resource units to be scheduled. This is illustrated in FIG. 5.

Figure 5:
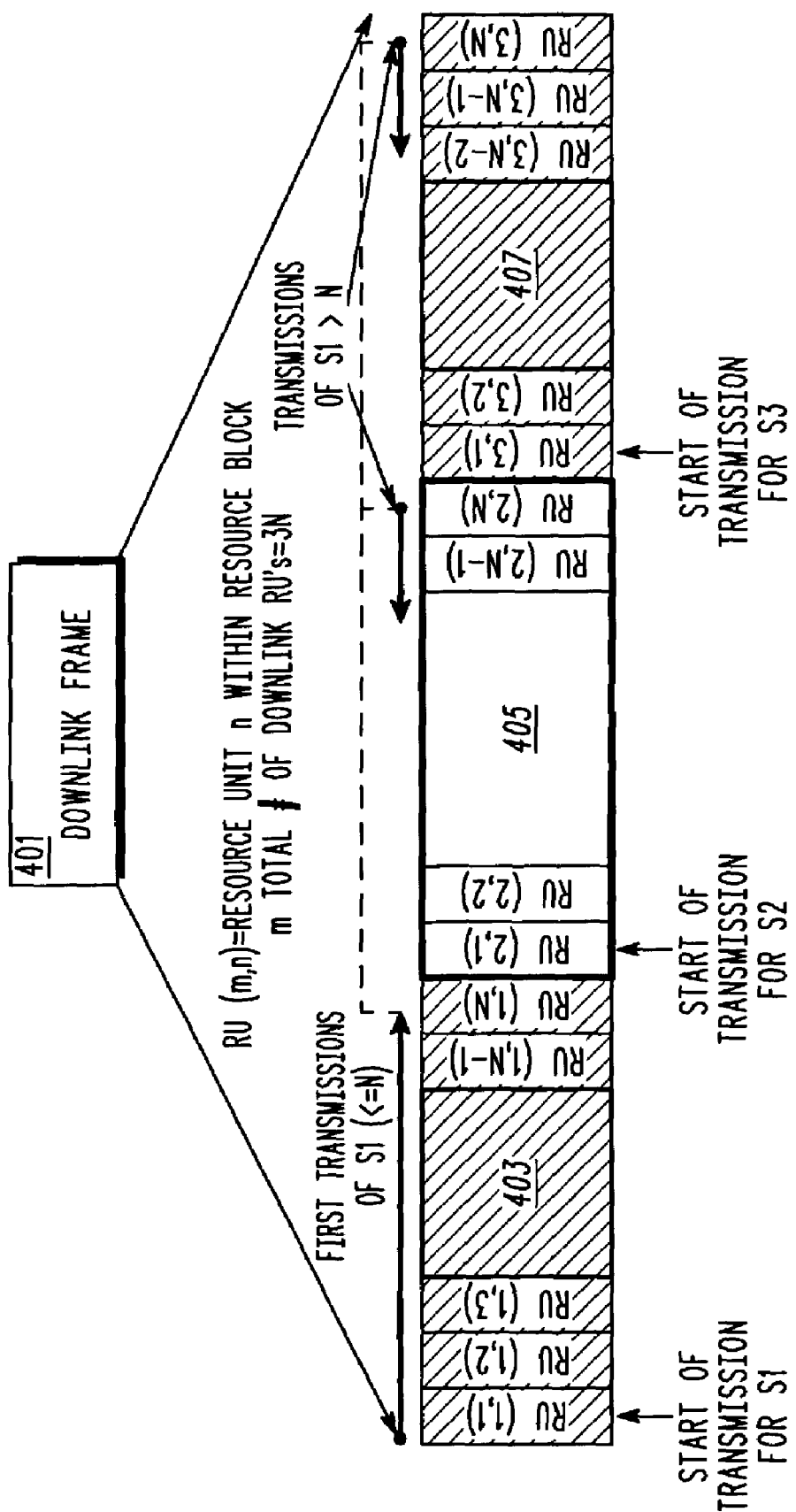
FIG. 5 illustrates interference avoidance in accordance with the preferred embodiment of the present invention.

With reference to FIG. 5, let N+4 be the number of resource units scheduled for transmission by sector S1. The first N resource units are scheduled for transmission in resource block 1 (resource unit(1,1) to resource unit(1,N)), while the remaining 4 resource units are scheduled to occupy resource units in the following order: (2,N), (3,N), (2,N−1), and (3,N−1). Thus, if the co-channel sectors S2, and S3 are lightly loaded, perfect interference avoidance (intra and inter-cell interference) can still be maintained. Also, the interference from S1 is distributed equally between S2 and S3. As the loading of the other co-channel sectors/cells, S2 and S3, is increased above 33%, the interference cannot be completely avoided. However, the number of resource units experiencing interference is kept low by the scheduling order used in the proposed method.

The above transmission technique greatly reduces co-channel interference when compared to prior-art interference avoidance techniques. Additionally the need for different transmitters to communicate with each other in order to coordinate their transmission schedules is eliminated.

It should be noted that with the above described interference avoidance scheme, transmissions (resource units) closer to the beginning of the sector assigned resource block (resource unit(1,1) for S1, resource unit(2,1) for S2, and resource unit(3,1) for S3) have higher probability of not being interfered than those at the end of the assigned resource block. Generally, the expected interference level for a scheduled resource unit varies with its position in the frame. For example, the resource units near the beginning of a sector's resource block are expected to be associated with a statistically lower interference level (or a higher link quality) than those near the end of the resource block. The expected variation in interference over the frame can be used to influence the position in the frame of a particular transmission among the whole of transmissions being scheduled in the frame, the modulation and/or coding scheme (AMC level), a spreading factor, or a transmit power level.

In an alternate embodiment of the present invention, these beginning resource units are used to carry system critical signaling/messages such as control channels, high priority delay-sensitive data channels, etc. since the expected interference level is lower on the resource units near the beginning of a sector's resource block. A higher reliability of control channels is advantageous because these channels must be decoded accurately for proper and efficient system operation. Alternate fill mappings (such as an offset and consistent left to right filling of resource units) will also have more and less robust resource units. In an additional embodiment, a multi-user scheduling algorithm can be used with the present invention. In this embodiment, the expected variations in link quality over the frame are use to influence the transmission characteristics associated with the resource units (e.g., transmission power, modulation and coding level, spreading factor, the relative ordering of scheduled transmissions to remote units)

It should also be noted that the above mapping can be considered as a logical mapping rather than a physical time domain mapping. Therefore, the actual physical transmission mapping can be any 1:1 mapping (permutation) of the resource unit indexing scheme described above. For example, a mapping which interleaves the given resource unit indexing can be used to disperse each sector's transmissions over the entire frame. For a time-domain interference avoidance strategy, this technique can be used to reduce the delay for the start of transmissions in S2 and S3 (this is especially useful if a control channel or other delay-sensitive information is being assigned to the high-reliability portion of each logical resource block). It also may have the added benefit of providing more time diversity in conjunction with channel coding. For a frequency domain interference avoidance strategy, the different co-channel sectors use orthogonal (different) sets of sub-carriers in an OFDM or multicarrier systems. In this case, a physical mapping that scrambles the co-channel sector sub-carriers is desirable in order to exploit the frequency diversity of the multi-path channel.

Finally, while the above example divides the downlink portion of the frame in to three equal duration blocks, if a priori or historical information is known about the average loading of the sectors (i.e., traffic volume), the downlink portion can be unequally divided among the co-channel sectors in proportional to their loadings.

Figure 7:
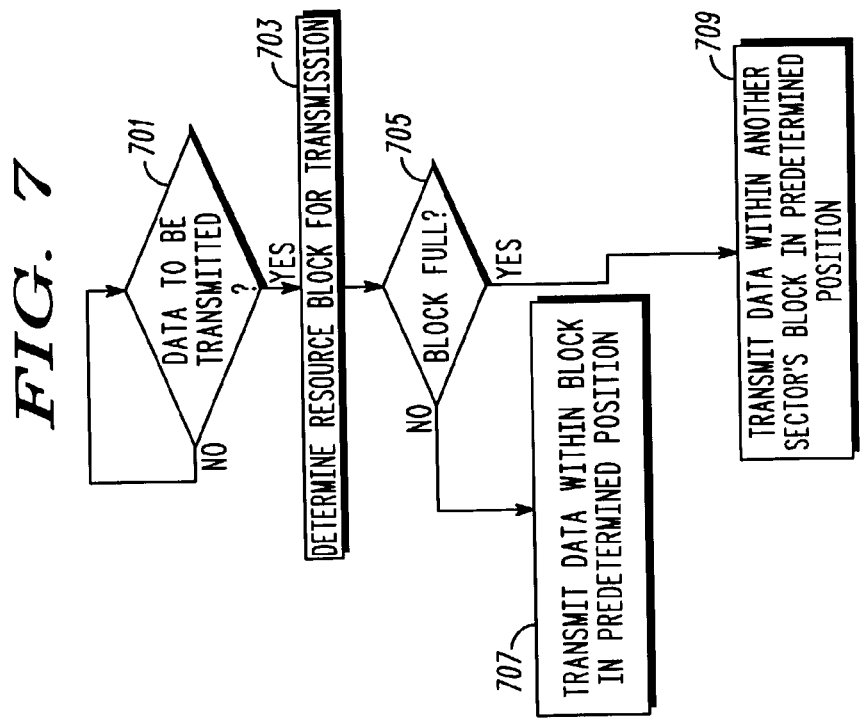
FIG. 7 is a flow chart showing operation of the base station of FIG. 6 in accordance with the preferred embodiment of the present invention.
Figure 6:
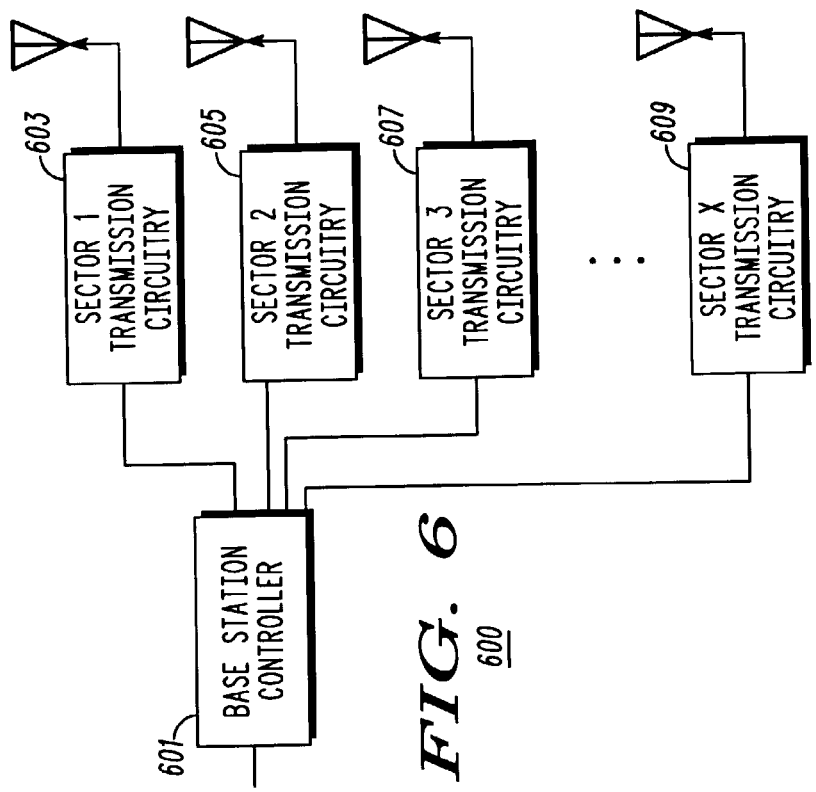
FIG. 6 is a block diagram of a base station of FIG. 1 in accordance with the preferred embodiment of the present invention.

FIG. 6 is a block diagram of a base station of FIG. 1 in accordance with the preferred embodiment of the present invention. As shown, the base station comprises base station controller 601 and a plurality of sectors 603–609. Operation of the base station occurs as shown in FIG. 7.

The logic flow begins at step 701 where controller 601 determines if data needs to be transmitted by a particular sector, and if not, the logic flow simply returns to step 701. If controller 601 determines that data needs to be transmitted by a particular sector, the logic flow continues to step 703 where a resource block for transmission is determined for the sector. As discussed above, downlink frames 401 are divided into M specific resource blocks 403, 405, 407 for transmission purposes. Each sector within base station 600 is assigned a particular resource block for transmitting downlink data. Once the particular resource block is determined, the logic flow continues to step 705. Alternatively, the controller may know apriori the resource block assignments for the sectors and thus step 703 can be skipped and the logic flows from step 701 to step 705. In step 705, controller 601 determines if the resource block is full, and if not the logic flow continues to step 707 where data is transmitted within the resource block in a predetermined position. If, however, it is determined that the resource block is full, the logic flow continues to step 709 where the data is transmitted within another sector's resource block in a predetermined position. More particularly, if it is determined that a particular sector's resource block is full, the controller transmits equal amount of data using resource units at the end of the resource blocks assigned to the other two sectors. In other words, the first two additional resource units are scheduled at the end of the other two resource blocks, the next two additional resource units are scheduled one unit earlier than the end of the other two resource blocks, and so on.

This process distributes the additional resource units among the other resource blocks and schedules them starting at the end of the other resource blocks, filling in a reverse direction. It can be seen for the (1,6,2) and (1,3,1) example that for the case when the loading of all neighboring co-channel sectors/cells is less than 33%, perfect interference avoidance is achieved.

The proposed interference avoidance method is also applicable to a combination of time and frequency interference avoidance. For the two-dimensional method, each element of the OFDM time-frequency grid can be treated as a resource unit (or several time-frequency resources can be grouped into a fundamental resource unit). Then a resource block for S1 (or one of the other groups) simply consists of a predetermined collection of these resource units along with a list specifying the order in which they are to be filled.

The proposed interference avoidance method can also be used in Code Division Multiple Access (CDMA) systems. In this case, each orthogonal code represents a particular channel, and different sets of orthogonal codes define the basic blocks S1, S2, and S3. However, using the method in the code domain requires the scrambling code to be the same in the sectors/cells that are involved in the interference avoidance process. Also note that the pilot code should not be allowed to be reused (or interfered with) in different sectors since this would lead to inaccurate channel estimation. A limitation of code domain interference avoidance is that multi-path channels will disturb the orthogonality between the Orthogonal codes. As a result, some residual intra-cell interference is likely to be present even if the same Orthogonal code is not used in neighboring sectors or cells.

It should be noted that CDMA systems can also use time domain, frequency domain, or time-frequency interference avoidance schemes described earlier if the system employs time-division multiplexing or multi-carrier transmission techniques.

The types of interference avoidance described above (e.g., time domain, frequency domain, time-frequency domain, etc.) can all be applied to a control channel as well as a data channel. The control channel may occupy a minimum sized set of resource units that are not shared with the data channel. The fraction of the minimum sized set of resource units (i.e., control channel loading) used within a frame is proportional to the number of users scheduled during the frame. Due to fat-pipe multiplexing techniques (i.e., trying to assign all channel resource units in a frame to a single user in good conditions), the control channel is often lightly loaded even when the data channel is heavily loaded. Therefore, interference avoidance on the control channel may be especially advantageous because it can improve control channel reliability (and hence data channel performance) significantly even with 100% data channel loading.

As noted previously, certain control resource units within the control channel resource block may be more prone to interference than others. In other words, at 33% loading there may be essentially no interference, and at 45% loading only some of the resource units may experience significant interference. A desirable feature of the present invention is that information that is labeled with a broadcast user ID can be placed in the most robust of the control channel resource units. Additionally, if beamformed control channels are allowed within the system, these users can have their control information placed in the less-robust control channel resource units without as significant an effect.

ADDITIONAL EXAMPLES

The above text described how the proposed interference avoidance method can be applied to a transmitted frame in total, or to a subset of a frame such as a control channel or data channel. In this section, additional examples are provided to clarify some of the ways for performing interference avoidance on multiple channels in a frame in accordance with the preferred embodiment of the present invention. These examples are for illustration purposes and are not meant to limit the scope of the present invention to any particular example described below.

Figure 8:
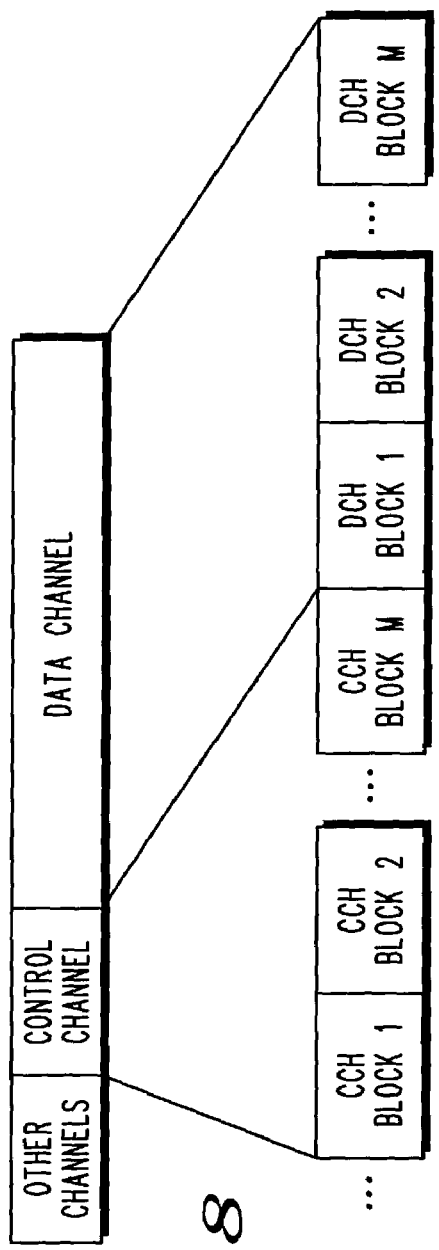
FIGS. 8–10 illustrate interference avoidance in accordance with the preferred embodiment of the present invention.

The first example performs interference avoidance independently on two channels of a frame, namely a control channel and a data channel, but does not use the interference avoidance method on other channels in the frame. This is illustrated in FIG. 8. In this example, the control channel, data channel, and other channels have separate locations within the frame. As a result, a control channel in one sector will never interfere with a data channel in another sector, and so forth. Interference avoidance is applied separately to the control channel resource units and to the data channel resource units, while the other channels are transmitted normally within their predefined resource units. In particular, each sector's control channels are assigned a particular resource block, along with each sector's data channels. Resource units are filled as discussed above. Particularly, if it is determined that a particular sector's control channel/ data resource block is full, the additional resource units are divided equally and are scheduled to be transmitted at the end of the control channel/data resource blocks assigned to the other sectors. This configuration makes it possible for the control channel to avoid interference even when the data channel is fully loaded (as described earlier), and also makes it possible for the data channel to avoid interference when the control channel is fully loaded.

Figure 9:
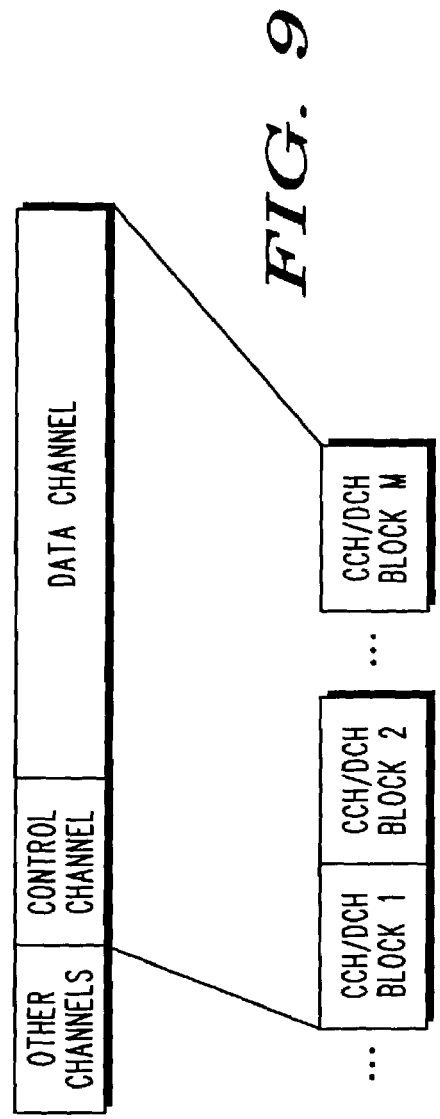

In the second example the control channel and data channel are grouped into a single (joint) block of resources for the purpose of joint interference avoidance, as shown in FIG. 9. For a particular sector, the control channel and data channel share a particular resource block. However, since the reliability of the control channel is considered to be more critical than the reliability of the data channel, the control channel is assigned to the highest reliability portion of the joint resource block. For example, the control channel would be mapped onto the resource units with the lowest likelihood of interference (e.g., starting with resource unit(1,1) in sector S1). With this approach, the control channels of different sectors will never interfere with each other, but the data channel of one sector can interfere with part or all of the control channel of another sector.

As described earlier, the channels do not need to be configured in a linear fashion. The above figures show the channels configured in a linear fashion only for ease of explanation. In practice the resource units of different channels can be dispersed over the frame using any invertible time or time-frequency remapping scheme. It should also be noted that pilot symbols could either be assigned as part of the data channel or as part of "other channels", or a combination of both. If pilots are treated as part of the "other channels" that do not participate in the interference avoidance method, then they will always be present, allowing mobiles to monitor the channel conditions even when data is not being transmitted. On the other hand, if they are treated as part of the data channel, the number of pilots transmitted in a frame will vary with the loading of the sector. In this case, the pilot will be turned off for some part of the frame when the loading is low on the data channel.

Asynchronous Cells

For communication systems employing asynchronous (i.e., non time aligned) cells, it is more difficult to achieve accurate interference avoidance, especially with the techniques described above. However, the time domain approach can still be used if the timing difference between cells is not that great. In this case, interference will begin to occur at lower system loads than for the synchronous case. If the cells are completely asynchronous, then a frequency domain avoidance strategy can be used. For multicarrier systems with a high level of isolation between the subcarriers (such as the broadband variants of iDEN known as WiDEN or Greenhouse), the lack of synchronization will have little impact. However, for OFDM systems, the energy of an asynchronous interfering subcarrier will splatter over several subcarriers of the desired signal. Thus, for OFDM, the frequency domain interference avoidance method can still provide a benefit, but may not be able to completely eliminate the interference.

Figure 3:
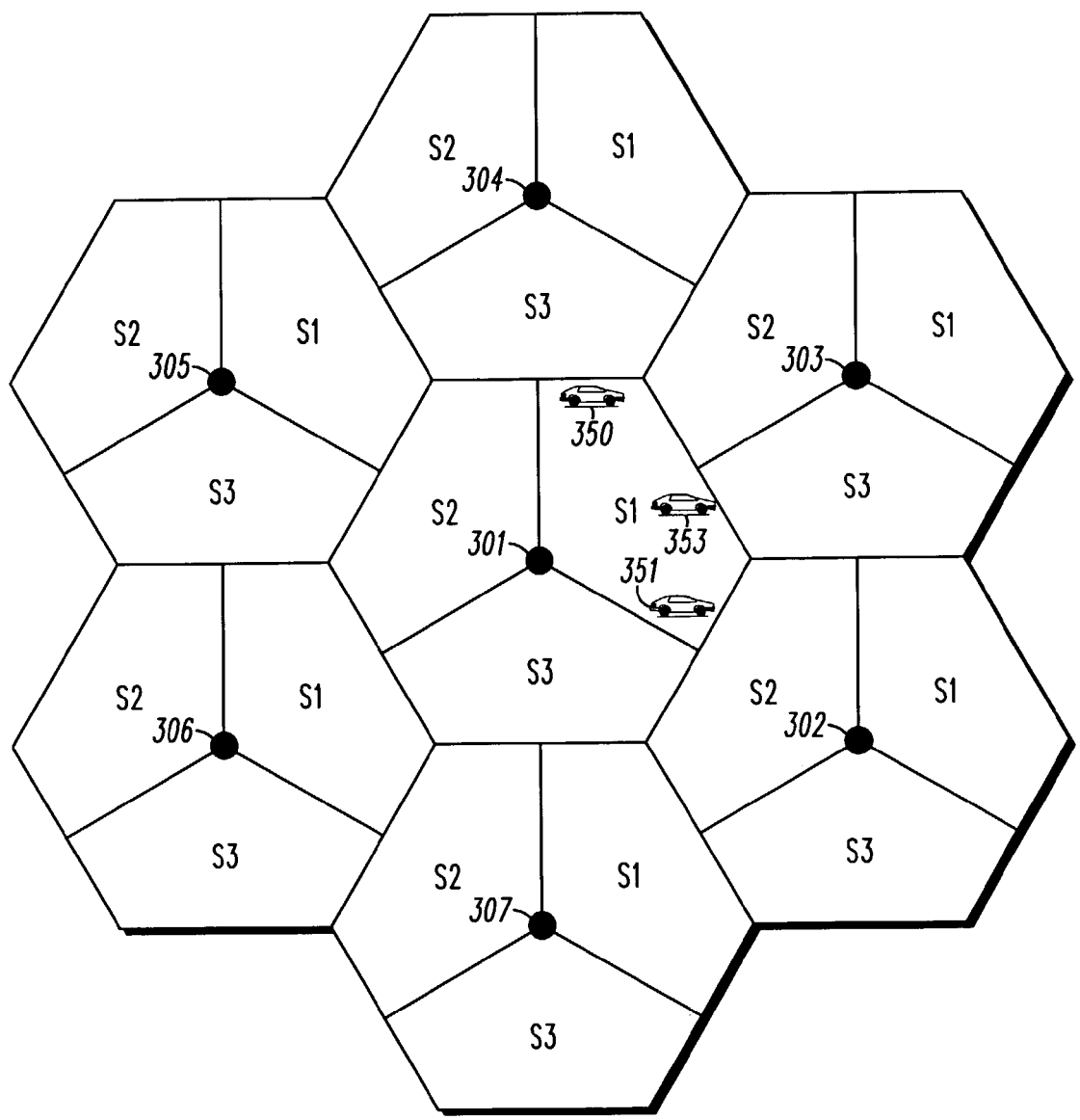
FIG. 3 illustrates a typical channel reuse pattern for the communication system of FIG. 1.

For asynchronous cells, above-described techniques can still be applied within a cell for single frequency re-use plans such as (1,3,1) to avoid interference from other sectors in the same cell. In this case, it is possible to avoid intra-cell interference at higher loads by taking advantage of the fact that the base station knows the individual load in each sector for the next frame. Based on this knowledge, the order of using resource units beyond the basic resource block can be adapted. For example, consider a 1-cell, 3-sector reuse plan where the same RF channel is used in every sector. The frame is divided into 3 distinct resource blocks S1, S2, and S3. Each sector is assigned one of S1, S2, or S3 as its default resource block as shown in FIG. 3.

Figure 10:
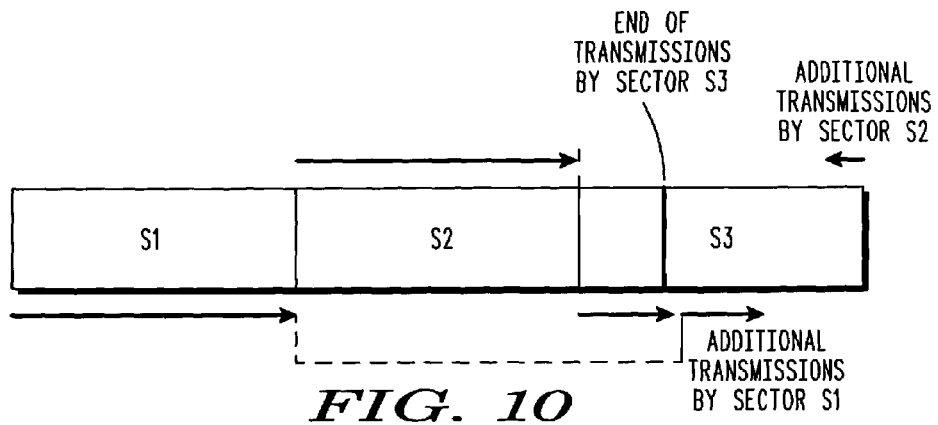

Consider the case where sectors S1 and S2 have a load somewhat greater than 33% (i.e., they require more resource units than are available in their baseline resource block, and will need to expand into another block), but sector S3 has a very low load. Inter-sector interference can be avoided by taking advantage of the base stations knowledge of the loading in each sector, as illustrated in FIG. 10. In this example, sectors S1 and S2 start at opposite ends of the unused portions of resource block S3 to avoid interfering with each other and sector S3.

IFDMA Interference Avoidance

Figure 11:
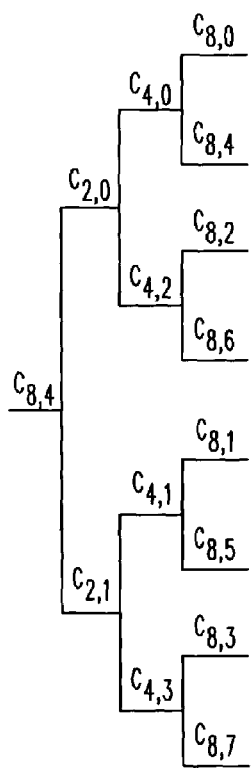
FIG. 11 illustrates a code-tree structure for a typical IFDMA system.

IFDMA (Interleaved FDMA) is a multicarrier orthogonal multiple access scheme. In IFDMA, the baseband signal begins as a single-carrier quadrature phase shift keying (QPSK) or quadrature amplitude modulation (QAM) symbol stream. The symbols are grouped into blocks which are repeated L times (repetition factor) prior to channelization code modulation, guard period insertion, filtering (typically with a root-raised cosine filter) and transmission, where L is an integer. In IFDMA, the transmissions for the different data rate users use IFDMA channelization codes, which are assigned from a code-tree structure as shown in FIG. 11. The channelization codes make the different users transmission in a sector orthogonal resulting in no intra-sector interference. In one embodiment, for no intra-sector interference, code are assigned such that when a specific code is used, no other code on the path from that code to the root and on the sub-tree beneath that code can be used.

Referring to FIG. 11, channelization code, $\{c_{L,k}\}$, corresponds to $k^{th}$ code with IFDMA repetition factor of L. Assignment of code, $c_{1,0}$, corresponds to the user occupying the entire RF bandwidth (all the subcarriers), while a user with code, $c_{8,1}$, occupies every eighth subcarrier in the frequency domain with an initial subcarrier offset of 1. A sector can assign the codes in any order and use any portion of the tree such that the different users transmissions in a sector are orthogonal to each other resulting in no intra-sector interference. However, the code assignments are only effective against intra-sector interference avoidance and not against intra-cell interference (from other sectors in the cell that use the same RF channel) and inter-cell interference. In a synchronous cellular system (cells in the system are synchronized to a common time base so that their frame periods are at least roughly aligned) with light to medium loading, with additional constraints on the code-tree structure and code usage, the proposed interference avoidance method below can automatically avoid both intra-cell interference and inter-cell interference in addition to intra-sector interference. Note that the interference avoidance is automatic in the sense that it does not require any base-to-base communication or scheduling coordination.

IFDMA Interference Avoidance in a Multi-cell Scenario

Figure 12:
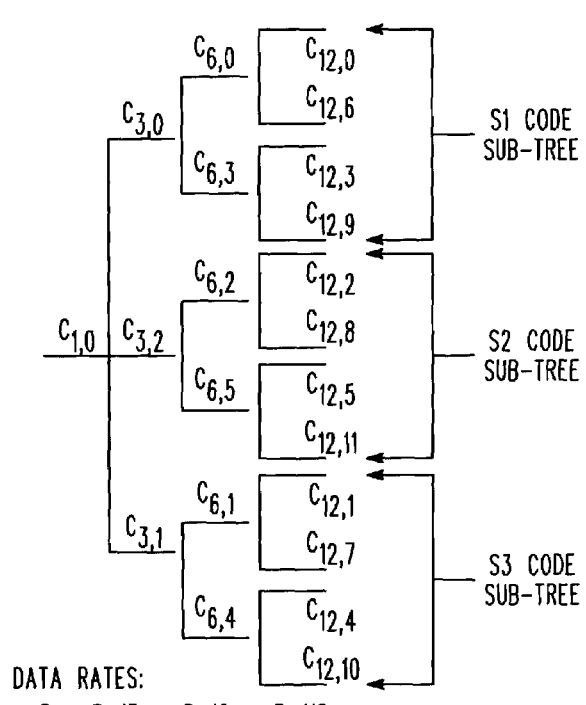
FIG. 12 shows partitioning of the code-tree structure in accordance with the preferred embodiment of the present invention.

As described above, for a deployment model of 1-cell, 6-sector, 2-frequency reuse plan, it can be seen that the interference scenario for a user is from co-channel interference from two dominant neighboring co-channel sectors (especially for users at the edge of the cell), while for a 1-cell, 3-sector, 1-frequency reuse plan, a base experiences co-channel interference from between two and four dominant neighboring co-channel sectors. With the sector labeling shown above, if a mobile unit is located in sector S1, the co-channel sectors are S2, or S3. Thus, in order to avoid/minimize interference between the three co-channel sectors, S1, S2 and S3, in the preferred embodiment of the present invention interference avoidance is accomplished by first dividing the channelization code-tree in to three sub-trees as shown in FIG. 12. The root of the sub-trees are labeled by the channelization codes $c_{3,0}$, $c_{3,1}$, and $c_{3,2}$.

In IFDMA, a resource block can be viewed as a group of channelization codes such as a sub-tree of an IFDMA channelization code-tree. The lower portion of the code sub-tree can be considered as the beginning of the sector's resource block while the top portion of the code sub-tree as the end of the sector's resource block. Each co-channel sector is initially assigned one of the three resource blocks (code sub-trees). The base schedules and allocates code to users from its code-tree. The codes are assigned to users according to the following algorithm:

1. Users in a particular sector that require channel resources for data transmission are sorted in order of their priority, data rates, and/or quality of service (QoS) requirements;
2. High priority/data rate/QoS users are assigned codes from the sector allocated code sub-tree beginning at the lower portion of the code sub-tree;
3. If all users cannot be assigned codes from the sector allocated code sub-tree, the remaining users are grouped in pairs and each user pair is assigned codes from the two other sector code sub-trees (one user per code sub-tree) such that the codes allocated are from the top portion of the code sub-tree. This process distributes the remaining users equally between the other two sectors.
4. The code assignments in steps 2 and 3 are such that the different users transmissions in a sector are orthogonal to each other resulting in no intra-sector interference.

Figure 13:
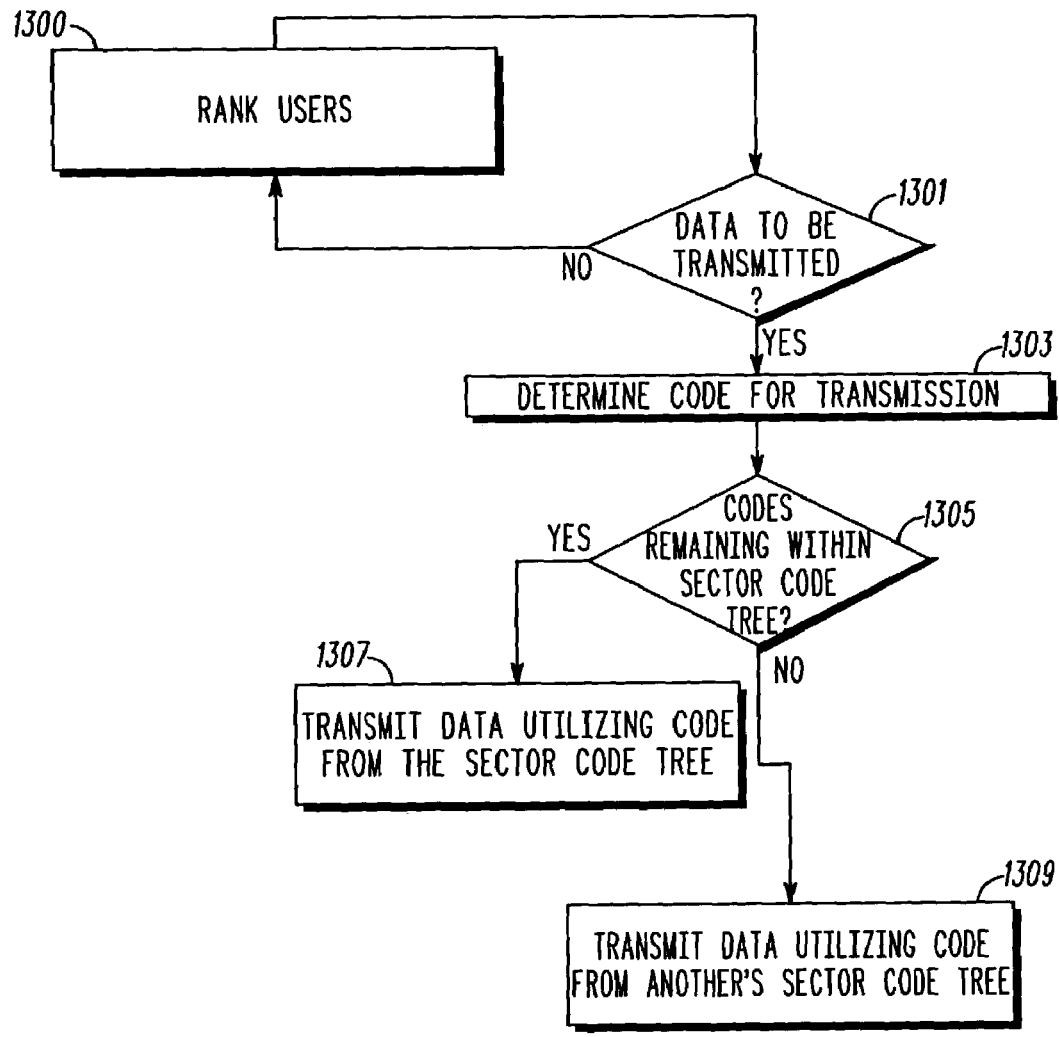
FIG. 13 is a flow chart showing operation of the base station of FIG. 6 in accordance with the preferred embodiment of the present invention.

FIG. 13 is a flow chart showing this process. The logic flow begins at step 1301 where users of a particular sector require resources are ranked by their priority, data rates, and/or QoS. It should be noted that in systems where all users receive the same priority, step 1301 can be skipped, with the logic flow beginning at step 1303. At step 1303 base station controller 601 determines a resource block that is used for transmission to the users in a particular sector. As discussed above, the IFDMA channelization code tree is divided into M=3 specific resource blocks (sub-trees). Each sector within base station 600 is assigned a particular resource block for transmitting data. Once the particular resource block is determined, the logic flow continues to step 1305. Alternatively, the controller may know apriori the resource block assignments for the sectors and thus step 1303 can be skipped and the logic flows from step 1301 to step 1305. Step 1305 to 1309 are performed for each user in the ranked list. In step 1305, it is determined if a channelization code is available in the resource block that satisfy the user data requirements and if so, the logic flow continues to step 1307 where the data is transmitted to the user utilizing that code from the sector resource block (code sub-tree). As discussed above, higher priority users are assigned codes from the sector allocated code sub-tree beginning at the lower portion of the tree while avoiding intra-sector interference. However, if at step 1305 no code is available from the sectors code sub-tree, the logic flow continues to step 1309 where data is transmitted to the user utilizing codes from the other sector's code sub-tree. As discussed above, these codes are utilized such that codes allocated are from the top portion of the code sub-tree while avoiding intra-sector interference.

Thus, with the above code assignment algorithm, for the case when the loading of all neighboring co-channel sectors/cells is less than 33%, perfect interference avoidance (intra and inter-cell interference) is achieved.

When the loading of any co-channel sector is greater than 33%, the remaining low data rate users (in step 3) which are assigned codes from the top portion of the other sector code-tree partially interfere with a portion of the other sector users (users which are assigned codes on the path from the interfering sector code to the root and on the sub-tree beneath that code). For example, let the data rate requirements for users in sector 1 be Rs/6, Rs/6, Rs/12 and Rs/12. The higher data rate users are assigned codes $c_{6,0}$ and $c_{6,3}$ from the sector 1 code sub-tree according to step 2. As no other code in the S1 code sub-tree can be assigned while avoiding intra-sector interference, the lower data rate users are assigned codes $c_{12,2}$ and $c_{12,1}$ according to step 3. Thus, if the co-channel sectors S2, and S3 are lightly loaded (<33%), perfect interference avoidance (intra and inter-cell interference) can still be maintained. Also, the interference from S1 is distributed equally between S2 and S3. As the loading of the other co-channel sectors/cells, S2 and S3, is increased above 33%, the interference cannot be completely avoided. However, the number of resources experiencing interference is kept low by the scheduling order used in the proposed method.

It should be noted that with the above described interference avoidance scheme, channelization codes near the bottom portion of the code sub-tree have higher probability of not being interfered (more robust) than codes near the top of the sub-tree at the end of the assigned block and hence could be assigned to system critical signaling/messages such as control channels, high priority delay-sensitive users etc.

The above example divides the code tree in to three equal bandwidth sub-trees. However, if apriori or historical information is known about the average loading of the sectors, the code tree can be unequally divided among the 3 co-channel sectors in proportional to their loadings.

For asynchronous cells, the proposed methods can still be applied within a cell to avoid interference from other sectors in the same cell. In this case, it is possible to avoid intra-cell interference at higher loads by taking advantage of the fact that the base station knows the individual load in each sector and the high load sectors can use the unused portions of the code sub-tree assigned to the low load sector.

The IFDMA interference avoidance technique is described for the downlink for maintaining the continuity of the application. However, IFDMA is more beneficial for the uplink due to its low peak-to-average ratio. In the uplink, users transmit data using the channelization codes determined by the sector as described above to avoid interference.

Figure 14:
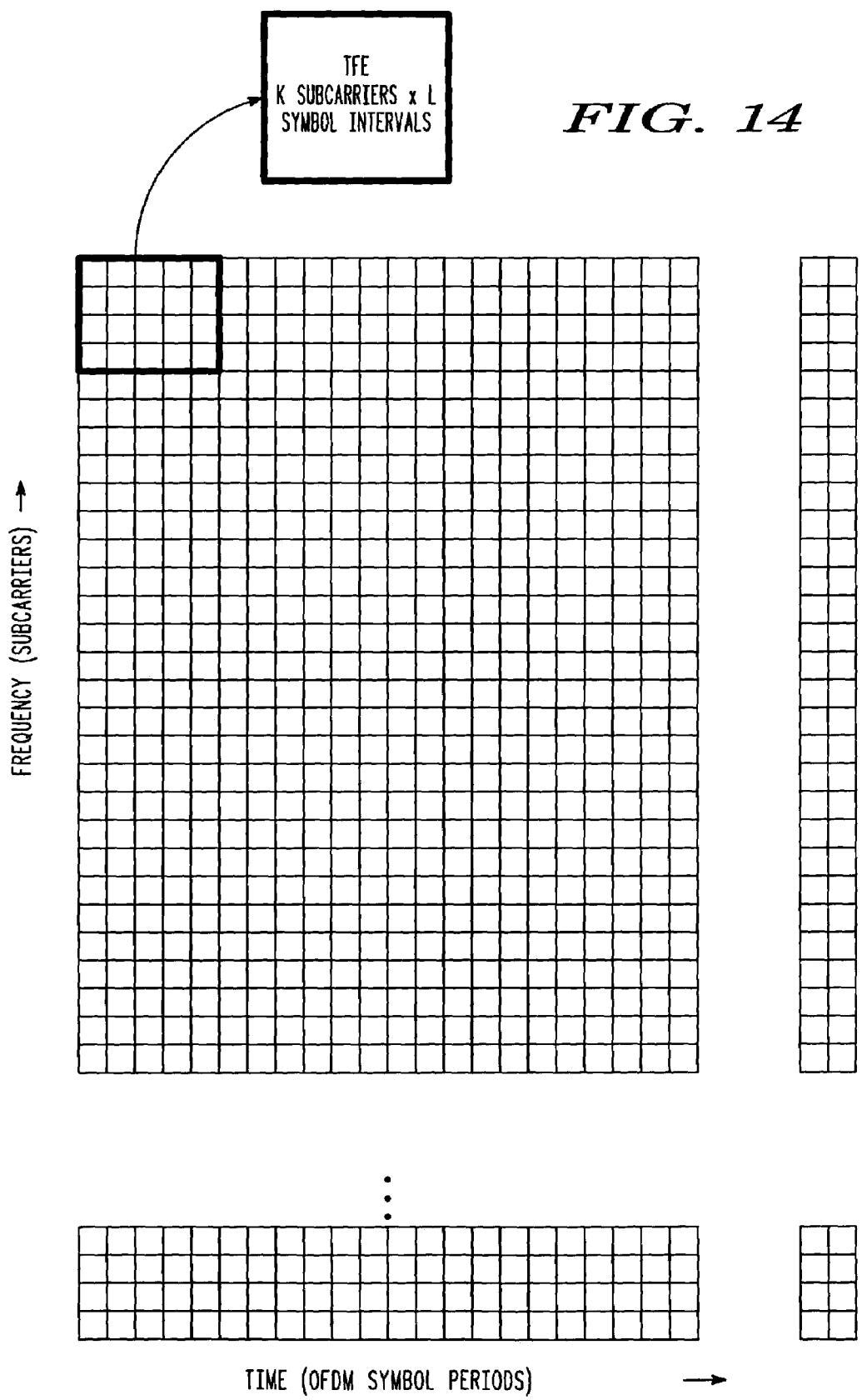
FIG. 14 shows an OFDM time-frequency grid and a time-frequency element (TFE) consisting of K subcarriers and L time intervals, in accordance with the present invention.
Figure 15:
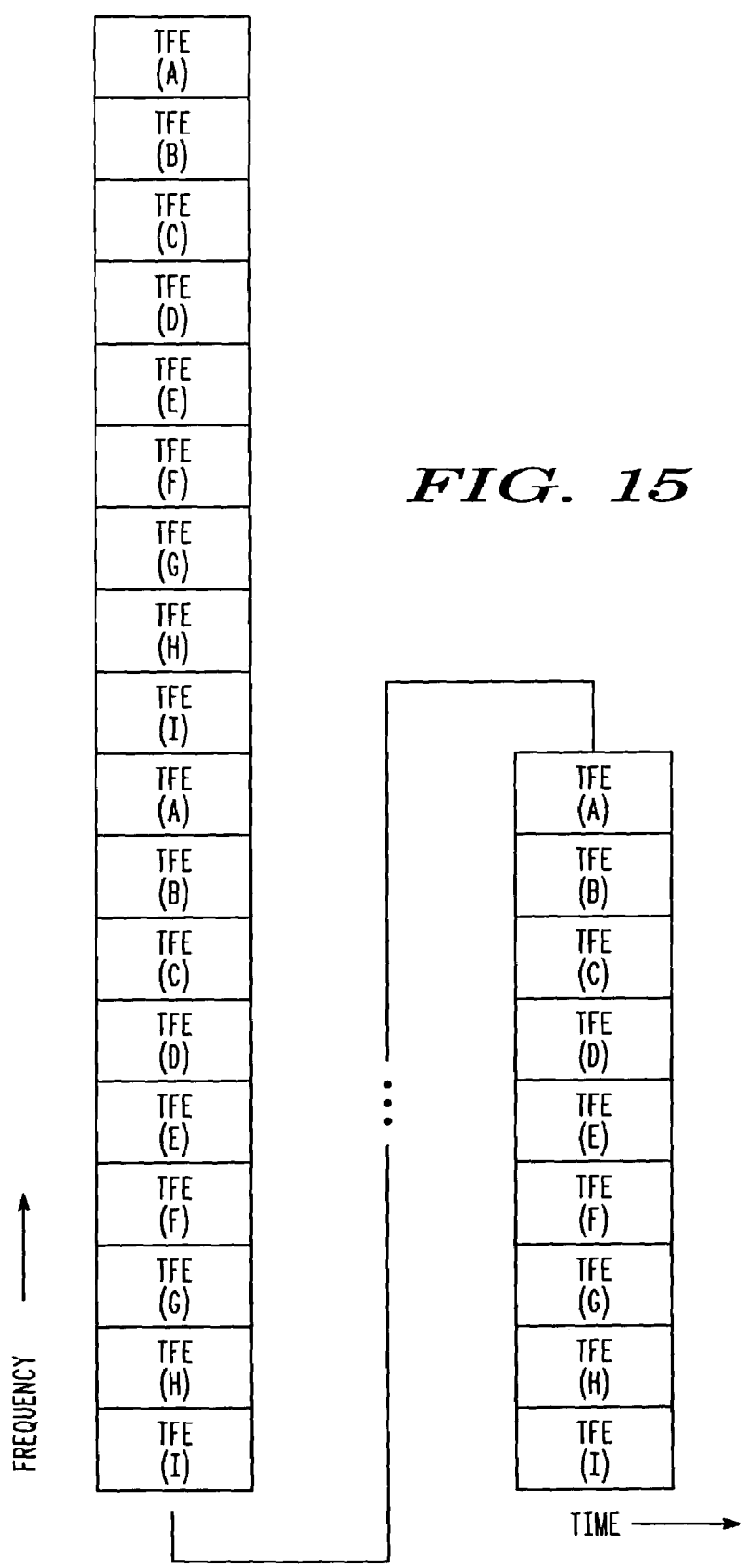
FIG. 15 shows an example arrangement of TFE's in accordance with the present invention.

FIG. 14 and FIG. 15 are intended to provide further clarification of how the present invention can be applied in the frequency dimension (especially for OFDM systems). FIG. 14 shows that a time-frequency element can be defined as one or more boxes of the OFDM time-frequency grid. For clarity, these are shown to be adjacent boxes forming the time-frequency element (TFE) in FIG. 14, but in reality, a TFE could be an arbitrary collection of adjacent or non-adjacent boxes. FIG. 15 shows several TFE's, particularly across frequency. Each TFE has an associated letter label such as '(A)', '(B)', etc. All TFE's having the same label are part of the same resource unit (resource unit, as defined/discussed later). Note that this shows that it is not necessary for the elements of an resource unit to be physically adjacent. There are a total of 9 different resource unit's (labels '(A)' through '(I)') shown, which together form a resource block (as defined later).

Based on the methods described in the preferred embodiment, the resource block can be divided into 3 sets of resource units. Each set of resource units would then contain 3 resource units, and the fill order of resource units would be determined in accordance with the invention. For example, sectors labeled 'S1' could fill resource units, as needed, in the order '(A)', '(B)', '(C)', '(I)', '(F)', '(H)', '(E)', '(G)', '(D)', while sectors labeled 'S2' could fill resource units in the order '(D)', '(E)', '(F)', '(C)', '(I)', '(B)', '(H)', '(A)', '(G)', and sectors labeled 'S3' could fill resource units in the order '(G)', '(H)', '(I)', '(C)', '(F)', '(E)', '(B)', '(A)', '(D)'. Note that the TFE's shown in FIG. 15 may represent only a portion of the system frame length. The remainder of the frame could contain TFE's with labels from '(A)' to '(I)' as has already been described, but their locations in the frequency dimension could be changed from time-to-time in a predetermined fashion to provide a frequency hopping benefit. In another embodiment, the remaining time intervals following the TFE's shown in FIG. 15 may be used for additional resource unit's, labeled as '(J)', '(K)', and so forth, in order to provide a resource block with a larger number of resource units. Note that this approach may be beneficial when low data rate services are supported in the system. In another embodiment, some parts of the time-frequency grid may be excluded from the resource block that is used as the basis for the invention. For example, it is possible to exclude certain pilot symbols, traffic channels, or control channels from the interference avoidance methods of the invention. In another embodiment, the time-frequency grid can be divided into a plurality of resource blocks (which are not necessarily adjacent in time and/or frequency—they can be interleaved over the frame), with each resource block containing different resource units, and the interference avoidance methods of the invention can be applied selectively within one or more of the resource blocks.

Adaptive Modulation/Coding (AMC) combined with Hybrid ARQ is well-known technique that is aptly suited to take advantage of the reduced co-channel interference provided by this invention. AMC selects the appropriate modulation and forward error correction coding level based on the measured, or inferred, co-channel interference that maximizes the information transfer rate between transmitter and receiver. Hybrid ARQ complements AMC by mitigating the impact of an inappropriate AMC level selection that has resulted in an irrecoverable channel error. An inappropriate AMC level may be characterized as one that is too aggressive, having too high a instantaneous transfer rate, for the co-channel interference level. Hybrid ARQ techniques constructively combine multiple transmissions of a particular data unit in order to decode the information content. As is well known by those skilled in the art, Hybrid ARQ may be implemented with a variety of schemes using either Chase combining or incremental redundancy. As a result of Hybrid ARQ, the energy of any failed transmission attempt may contribute to the ultimate successful decoding of the information content. The combination of AMC and Hybrid ARQ serve to maximize the overall information transfer rate of the system.

The AMC level selection algorithm may be modified to take advantage of the reduced co-channel interference levels provided by this invention. In general, the level of co-channel interference seen by any particular resource unit is uncertain. However, the likelihood of interference is less for those resource units positioned at the beginning of the resource block as compared to those positioned at the end. As a result, the AMC selection algorithm may designed so that AMC level of a resource unit assigned to the beginning of the resource block is more aggressive then the AMC level assigned towards the end of resource block where is more likely to see co-channel interference from a neighboring sector. In a similar manner, a transmitter may tailor the AMC level selection algorithm to mitigate the co-channel interference it might produce for a neighboring sector. For instance if user traffic demands dictate that the sector must exceed their assigned resource block by scheduling resource units in other sector's assigned resource block, the transmitter may mitigate the inference caused to a neighboring sector by reducing the transmission power and selecting a less aggressive AMC level.

Figure 16:
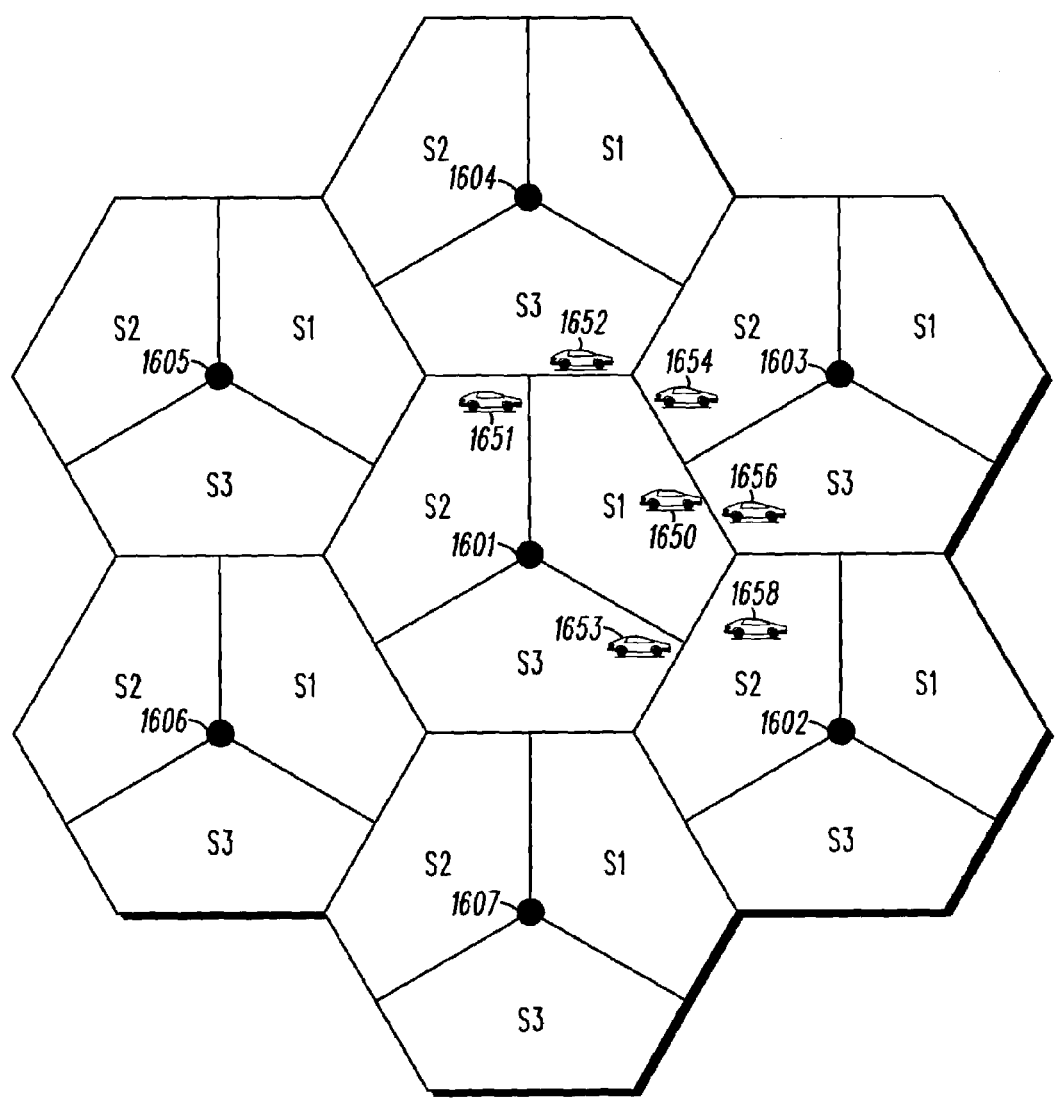
FIG. 16 shows an example of present invention as applied to uplink interference avoidance.

Although the preferred embodiment was described mainly from a downlink perspective, the present invention is equally applicable to the uplink. Thus when applicable to uplink situations, a method of interference avoidance divides a frame into a plurality of resource blocks capable of supporting uplink transmissions from a plurality of remote units. For a particular sector, transmissions are scheduled from remote units to begin at a beginning of the sector's resource block up to a point where the resource block cannot support any more transmissions, beyond that point, additional transmissions are scheduled to be transmitted within resource blocks assigned to other sectors. FIG. 16 shows one example with a (1,3,1) frequency reuse pattern where a mobile unit 1650 is transmitting to base station 1601 in sector S1. Mobile units 1652, 1654, 1656, and 1658 are transmitting to base station 1604 in sector S3, base station 1603 in sector S2, base station 1603 in sector S3, and base station 1602 in sector S2, respectively. Also, mobile unit 1651 is transmitting to base station 1601 in sector S2, and mobile unit 1653 is transmitting to base station 1601 in sector S3. Since mobile unit transmit antennas are typically omni-directional, mobile units 1652, 1654, 1656, and 1658 can be dominant interferers to mobile unit 1650. Also, since the base station sector antenna patterns are not ideal, mobile units 1651 and 1653 are potential sources of additional interference. However, when the methods of the present invention are applied to the scheduling of uplink transmissions (where such scheduling is commonly controlled by the base station), note that none of these six interferers would begin their transmissions in the resource block S1 used by mobile unit 1650. Therefore, the present invention provides similar functionality for either downlink transmissions or uplink transmissions, or both.

While the invention has been particularly shown and described with reference to a particular embodiment, it will be understood by those skilled in the art that various changes in form and details may be made therein without departing from the spirit and scope of the invention. For example, the proposed methods described above can be applied to other frequency reuse plans, but the number of resource blocks and fill orders may be different than what was illustrated for (1,3,1) and (1,6,2). Also, a larger number of blocks and/or modified fill orders could be used with (1,3,1) or (1,6,2) while still falling within the scope of the invention. It is intended that such changes come within the scope of the following claims.

The invention claimed is:

1. A method of interference avoidance in an IFDMA communication system, the method comprising the steps of:
   for a particular sector, utilizing for transmissions a portion of an IFDMA channelization code tree as a code resource block, the code resource block capable of supporting transmission to/from a plurality of remote units;
   for the particular sector, scheduling transmissions to/from remote units using IFDMA channelization codes from the sector's code resource block up to a point where the code resource block cannot support a particular transmission, beyond that point, the particular transmission is scheduled to be transmitted using an IFDMA channelization code from a code resource block assigned to another sector; and
   wherein the sub-tree of the IFDMA channelization code tree comprises approximately ⅓ of the IFDMA channelization code tree.

2. The method of claim 1 wherein the code resource block comprises a sub-tree of the IFDMA channelization code tree.

3. The method of claim 1 wherein scheduling transmissions comprises scheduling control channel transmissions.

4. A method comprising the steps of:
   determining a code resource block utilized for a particular transmission, wherein the code resource block comprises a portion of an IFDMA channelization code free;
   determining if a channelization code is available within the code resource block that can satisfy a transmission;
   using the channelization code from the code resource block when transmission can be satisfied, otherwise using a channelization code taken from a code resource block assigned to a different sector;
   wherein the code resource block comprises a sub-tree of the IFDMA channelization code tree; and
   wherein the sub-tree of the IFDMA channelization code tree comprises approximately ⅓ of the IFDMA channelization code tree.

5. A method of interference avoidance in a communication system, the method comprising the steps of:
   for a particular sector, utilizing for transmissions a portion of a multiple-subcarrier resource block comprising a plurality of resource units, each resource unit capable of supporting multiple-subcarrier transmission to/from a remote unit, wherein each resource unit comprises a plurality of time-frequency elements, each time-frequency element comprising at least one subcarrier, and each resource unit comprising time-frequency elements with differing subcarriers; and
   for the particular sector, scheduling transmissions to/from remote units using the sector's resource units up to a point where the resource units cannot support a particular transmission, beyond that point, the particular transmission is scheduled to be transmitted using a resource unit assigned to another sector.

6. The method of claim 5 wherein the resource unit assigned to another sector comprises time-frequency elements coincident in time with time-frequency elements in the portion of the multicarrier resource block of the particular sector.

7. The method of claim 5 wherein the portion of the multiple-subcarrier resource block is a predetermined collection of resource units and the order in which they are utilized is based on a list specifying the order in which they are to be filled.

8. The method of claim 5 further comprising the step of:
   for the particular sector, utilizing a resource unit having a highest reliability from the sector's resource units for a control channel transmission, and utilizing another resource unit from the sector's resource units for a data channel transmission.

9. The method of claim 5 wherein the transmissions comprise data channel transmissions, and further comprising the steps of:
   for a particular sector, utilizing for control channel transmission a portion of a second multiple-subcarrier resource block comprising a second plurality of channel resource units for control channel transmission;
   for the particular sector, scheduling control channel transmission to/from remote units using the sector's second resource units up to a point where the second resource units cannot support a particular transmission, beyond that point, the particular transmission is scheduled to be transmitted using a resource unit for control channel transmissions assigned to another sector;
   wherein the control channel transmissions are non-interfering with the data channel transmissions.

10. A method of interference avoidance in an IFDMA communication system, the method comprising the steps of:
    for a particular sector, utilizing for transmissions a portion of an IFDMA channelization code tree as a code resource block, the code resource block capable of supporting transmission to/from a plurality of remote units;
    for the particular sector, scheduling transmissions to/from remote units using IFDMA channelization codes from the sector's code resource block up to a point where the code resource block cannot support a particular transmission, beyond that point, the particular transmission is scheduled to be transmitted using an IFDMA channelization code from a code resource block assigned to another sector; and
    wherein the step of scheduling transmissions comprises the step of scheduling a control channel transmission using a channelization code from the code resource block having a higher probability of not being interfered with than another channelization code from the same code resource block.

* * * * *